June 25, 1968  J. D. EMMONS  3,389,412
CUTLERY UTILITY ASSEMBLY
Filed May 31, 1966
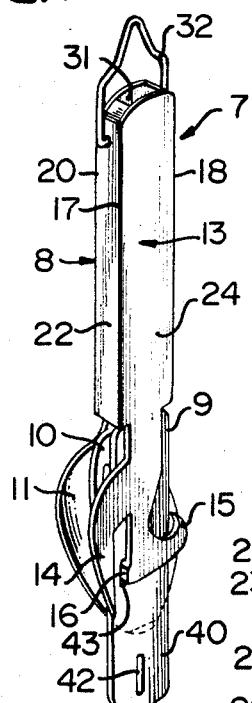
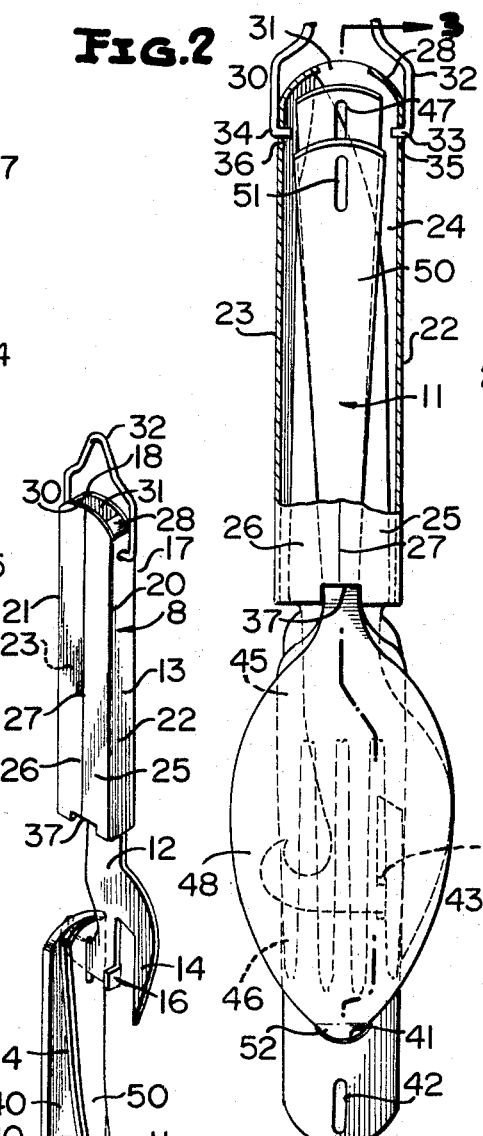
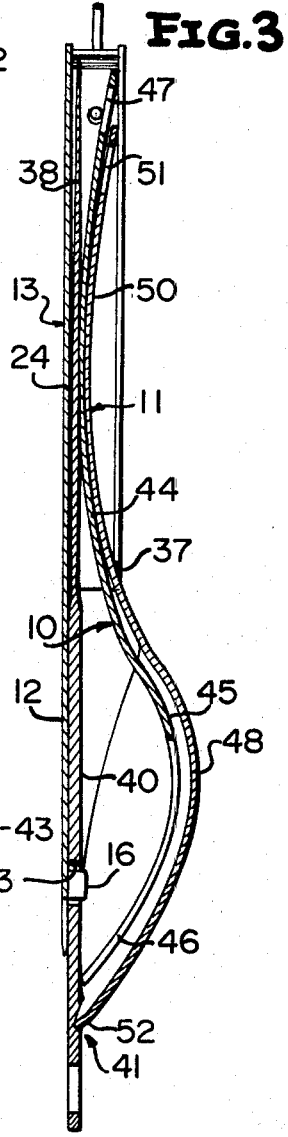
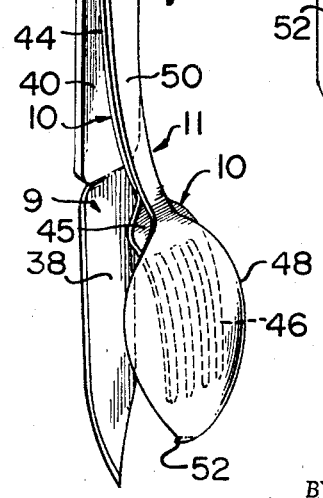
INVENTOR
Jack D. Emmons
BY
Baldwin, Wight, Diller & Brown
ATTORNEYS United States Patent Office 3,389,412
Patented June 25, 1968

3,389,412
CUTLERY UTILITY ASSEMBLY
Jack D. Emmons, Waco, Tex., assignor to
Leo Bradshaw, Waco, Tex.
Filed May 31, 1966, Ser. No. 554,158
13 Claims. (Cl. 7—14.25)

ABSTRACT OF THE DISCLOSURE

A combination knife, fork, spoon and container opener is provided, which may be assembled as a compact unit, with various of the members being held together in locking engagement. The container opener has a handle portion and bottle and can opener portions. The handle portion of the container opener receives the handle of each of a fork and spoon, and the blade of a knife. Fork prongs are received within the bowl of a spoon, and the forward tip of the spoon bowl is engaged against a groove in the handle of a knife. Means are provided for lockingly engaging the handle of the knife with the container opener, utilizing the resilence of the members, particularly the spoon to maintain the members in a desired engagement. Means are also provided for locking the spoon against lateral movement within the handle of the container opener. The container opener handle portion is constructed of sheet metal, into a box-like configuration and has a drainage opening at one end thereof, adjacent means for facilitating the hanging of the container opener. The can opener portion of the container opener is adapted to be engaged within slots in the handles of each of the knife, fork and spoon, to facilitate the sterilization thereof.

---

This application relates in general to new and useful improvements in the cutlery art, and in particular to a new and useful knife, fork, spoon, and bottle and can opener combination, which elements are releasably inter-engaged to form a novel cutlery combination.

It is a primary object of the present invention to provide a compact unit of eating utensils which comprises securely inter-engaged elements which may be readily disengaged when their use is desirable.

It is another object of the present invention to provide a novel means for combining a container opener, a knife, a fork and a spoon, into a compact unit, and to effect a locking of the elements of the combination by a locking means provided by the knife and spoon.

It is a further object of the present invention to provide a novel compact knife, fork, spoon and container opener combination, which container opener includes a bottle opener and a can opener, whereby operative pointed edges of the bottle opener and the can opener are directed towards the knife handle to define a smooth contour therewith and to preclude protrusion therefrom of sharp edges.

It is yet another object of this invention to provide a novel knife, fork, spoon and container opener combination, which, when disassembled, provides a means to readily facilitate sterilization of the knife, fork, and spoon.

It is another object of the present invention to provide a novel utensil combination, comprising a container opener, having a handle portion which receives a knife blade having a protruding handle, and fork and spoon handles therein, the fork having prongs which are positioned between the knife handle and a bowl portion of the spoon, in order to prevent accidental injury from the fork prongs.

It is a further object of this invention to provide a novel utensil combination, including a container opener having a handle portion and a utensil portion, which utensil portion provides an upstanding lug for engagement with a notch of an adjacent knife handle, and which handle portion provides a notch for engagement by a handle portion of a spoon, thereby preventing lateral displacement of the respective elements with respect to the container opener.

It is a further object of this invention to provide a novel utensil combination, including a container opener having a utensil portion and a handle portion, constructed from sheet material, and having arcuate portions bent over an end thereof, defining an open end portion for fluid drainage therethrough.

With the above, and other objects in view that will hereinafter appear, reference is made to the following description, the appended claims, and the several views illustrated in the accompanying drawings.

In the drawings:

FIGURE 1 is a top perspective view of a knife, fork, spoon and container opener utensil combination of this invention, and illustrates the relative positions of each of the above elements in their inter-engaged positions.

FIGURE 2 is a rear elevational view, of the utensil combination of FIGURE 1, with portions thereof being illustrated in section, and illustrates the relative positions of each of the elements of this invention, in their overlying and inter-engaged relation to each other.

FIGURE 3 is a vertical sectional view taken along the line 3—3 of FIGURE 2, and illustrates the inter-engagement of a container opener engagement lug with a knife handle, and the inter-engagement of a spoon tip and knife handle, with a fork positioned therebetween.

FIGURE 4 is a top perspective view of the utensil elements of this invention, taken from the rear of the illustration of FIGURE 1, and shows a knife, fork, and spoon disposed in hanging relation about a bottle opener portion of the container opener of this invention.

Referring now to the drawings in detail, reference is first made to FIGURE 1, wherein there is illustrated a compact utensil combination 7 of this invention, comprising a contianer opener 8, a knife 9, a fork 10 and a spoon 11.

The container opener 8 includes a utensil portion 12 and a handle portion 13. The utensil portion 12 includes a can opener portion 14, a bottle opener portion 15, and an upstanding lug 16. The can opener portion is longitudinally extensive, away from the handle portion 13 of the container opener 8. The bottle opener portion 15 is rearwardly curved, as opposed to the can opener portion 14, toward the handle portion 13 of the container opener 8. The upstanding lug 16 extends transversely of the plane of the remainder of the utensil portion 12 of the container opener 8, on the same side of the container opener 8 as that which forms a major portion of the handle 13.

The handle portion 13 of the container opener 8 is of generally "box-like" configuration, or rectangular in cross-section, being constructed of substantially identical portions folded transversely along lines 17, 18 and 20, 21 to define handle sidewalls 22, 23 on opposite sides of front wall 24, terminating in rear wall flaps 25, 26 along a mating line 27.

One end of the handle portion 13 of the container opener 8 terminates in arcuate flange portions 28, 30, defining a drainage hole 31 therebetween.

A wire hook 32 is disposed across the handle portion 13, between sidewalls 22 and 23, and attached thereto by inwardly projecting end portions 33, 34 of the wire hook 32, extending through holes 35, 36 in respective sidewall portions 22, 23.

An opposite end of the handle portion 13 of the container opener 8, from that having the drainage hole 31 therein, includes a rectangular notch 37 disposed across rearward flaps 25, 26, symmetrically disposed about the mating line 27.

The knife 9 includes a blade portion 38 and a handle portion 40. The blade 38 may be of any suitable type, such as is commonly used for hunting, fishing, or the like, or may be of the eating utensil type, as such is desired. The handle 40 is of rather thin construction, and is preferably of about three times the thickness of the blade portion 38. An arcuate groove 41 is disposed approximately centrally of, and adjacent one end of the handle portion 40 of the knife 9 and comprises an indentation thereof. A longitudinally slotted hole 42 is disposed inwardly of an end of the handle portion 40 of the knife 9, outwardly of the groove 41. The slotted hole 42 is adapted to provide a means for hanging the knife for sterilization, as will later be described. The handle portion 40 of the knife 9 also includes a slotted hole 43, positioned adjacent and preferably inwardly of one edge of the handle portion 40, adapted to receive the lug 16 of the container opener 8 therein, in the assembled condition of the utensils of this invention.

The fork 10 includes a handle portion 44 and a pronged portion 45, the pronged portion 45 comprising a plurality of prongs 46, and is arcuately curved in the customary manner. An end of the handle portion 44 of the fork 10 includes a centrally disposed slotted hole 47, adapted to facilitate hanging of the fork 9 for sterilization purposes. The handle portion 44 of the fork 9 is also smoothly curved in the usual manner, in order to facilitate grasping by the hand of a user.

The spoon 11 includes a bowl portion 48 and a handle portion 50, each of which are respectively arcuately curved in the customary manner in order to facilitate grasping and the retention of food therein. One end of the handle portion 50 of the spoon 11 includes a centrally disposed slotted hole 51 in order to facilitate hanging of the spoon 9 thereby. An opposite end of the spoon 9 includes a protruding inwardly bent arcuate tip 52, adapted for engagement with the groove 41 of the handle 40 of the knife 9. The spoon bowl 48 is preferably sufficiently large to overlie the pronged portion 45 of the fork 10, when the utensils are in their assembled condition, as is illustrated in FIGURE 3.

Each of the above described utensils may be made from any suitable material, but it has been found that polished stanless steel is preferred, because of its ability to avoid rusting and oxidation of the material of the utensils. Additionally, stainless steel or the like metal will provide the desired resiliency of the metal to facilitate interengagement of the various elements.

The utensil combination 7, in its assembled condition, is clearly illustrated in FIGURE 1. The knife 9 is positioned with its blade portion 38 inserted into the handle portion 13 of the container portion 8, adjacent the rear wall portion 24 of the handle portion 13, and overlying utensil portion 12 of the container opener 8, with the slotted hole 43 positioned about the lug 16 of the utensil portion 12, and the lug 16 extending therethrough.

The fork 10 is positioned adjacent the knife 9, with ends of prongs 46 of prong portion 45 disposed against the handle portion 40 of the knife 9.

The spoon 10 is positioned in overlying relation to the fork 9, and has its inturned protrusion 52 in engagement with the groove 41 of the knife 9. The handle portion 50 of the spoon 11 which is most adjacent the bowl 48 of the spoon 11 is engaged within the notch 37 of the handle portion 13 of the container opener 8, and the spoon 11 and enclosed fork prong portion 45 are thus secured against lateral movement with respect to the container opener 8. The curvature of the fork 10 and spoon 11 facilitate slight resilient engagement of the protrusion 52 of the spoon 11 within the groove 41 of the knife 9.

In order to disassemble the utensil combination 7, the knife 9, fork 10, and spoon 11, are grasped by their respective portions which protrude outwardly of the handle portion 13 of the container opener 8, and are moved transversely, away from the utensil portion 12 of the container opener 8 (to the right of FIGURE 3), until the notch 43 of the handle portion 40 of the knife 9 clears the lug 16 of the container opener 8, and the knife 9, fork 10, and spoon 11 are then moved vertically downwardly as a unit, until their respective blade and handle portions are removed from within the handle portion 13 of the container opener 8. It is thus readily seen that the resiliency of the handle portion 40 of the knife 9 is important in the disassembly process.

To reassemble the utensils, the reverse of the above described operation is effected. That is, the fork 10 is positioned with its prong portion 45 inwardly of the bowl portion 48 of the spoon 11, and both are placed into overlying relation with the knife 9, with the protrusion 52 of the spoon 11 in engagement with the groove 41 of the knife 9. Holding the elements in this position, the blade 38 of the knife 9, the handle 44 of the fork 10, and the handle 50 of the spoon 11 are slid into handle portion 13 of the container opener 8, until the notch 43 of the knife 9 is in overlying relation to lug 16 of the container opener 8.

It is often desirable to sterilize the various eating utensils prior to use. The present invention facilitates a sterilization of the utensils by providing the slotted holes 42, 47 and 51 on respective knife 9, fork 10 and spoon 11 utensils, which slotted holes are adapted to be positioned over bottle opening portion 15 of utensil portion 12 of container opener 13, in the manner illustrated in FIGURE 4, the hooked bottle opener portion 15 providing a means for hanging the knife 9, fork 10 and spoon 11 utensils over a pot of boiling water or the like, while the container opener 8 is hung from some suitable member by attachment of a string or the like to the hook or ring 32 of the container opener 8.

It is to be noted, that a primary feature of the utensil assembly 7, in the assembled condition illustrated in FIGURE 1, resides in the fact that the can opener portion 14 and bottle opener portion 15 of the utensil portion 12 of the container opener 8 blend with, or tend to form a smooth contour with, the handle portion 40 of the knife 9, thus precluding the outward projection of sharp points, which may tend to pierce the hand of the user. It is also to be noted, that all of the prongs 46 of the fork 10 are completely housed by the bowl 48 of the spoon 11, thus also precluding accidental cutting or piercing of the hand of the user.

The knife 9, fork 10 and spoon 11 may also be resiliently engaged within the handle portion 13 of the opener 8, either alone, or in combination with the locking engagement of the protrusion 52 of the spoon 11 with the groove 41 of the knife 9. In order to effect a resilient locking engagement, the handle portion 50 of the spoon 11 is tensioned within its elastic limit upon insertion into the handle portion 13 of the opener 8 to place the concave surface of the handle portion 50 (at the right of FIGURE 3) in tension and the opposite convex surface of the handle portion 50 in compression. This tensioning of the spoon handle portion 50 is predetermined and dependent upon the particular inside width of the opener housing portion 13, between front wall 24 and either of rear wall flaps 25, 26. The tensioning facilitates locking engagement of the handle portion 50 of the spoon 11 within the notch 37 of the container opener 13, as well as resilient contact of the spoon bowl portion 48 against the handle portion 40 of the knife 9. The spoon 11 may be lockingly engaged by tensioning within the handle portion 13 of the opener 8 either with or without the fork 10 in the combination.

While the material of the various utensils of this invention has been described to be preferably stainless steel, other suitable materials having the desired characteristics of strength, resiliency and the like, such as plastic, would also be suitable as a construction material for the utensils of this invention.

While only preferred embodiments of the invention have been illustrated and described herein, it is to be understood that minor modifications may be made in the utensil assembly of this invention, within the spirit and scope of this invention, as defined in the appended claims.

I claim:

1. In the combination of a container opener, a knife and a spoon, said container opener comprising a utensil portion and a handle portion, said knife having a blade portion and a handle portion; and means on the handle portion thereof for lockingly engaging said opener utensil portion, said spoon having a handle portion and a bowl portion, said spoon handle portion and knife blade portion being received within said opener handle portion, said spoon bowl portion having locking means thereon for engaging cooperating locking means on said knife handle portion; said knife and spoon having slotted holes at ends of the handle portions thereof; said opener utensil portion including a can opening blade and a bottle opener at an end remote from the opener handle portion; said blade having a pointed portion directed toward and defining a contour which merges with said knife handle portion; said bottle opener having a curved end extending toward said opener handle portion and defining means for engaging the slotted holes in handle portions of each of said knife and spoon for hanging said knife and spoon therefrom.

2. The combination of claim 1 wherein said spoon bowl portion locking means and said knife handle portion locking means provide means for retaining said knife handle portion in locking engagement with said opener utensil portion.

3. The combination of claim 2 including a fork having prong portions and a handle portion; said fork being disposed between said knife and spoon with said fork prong portions being housed between said knife handle portion and said spoon bowl portion.

4. The combination of claim 3 wherein a handle portion of said fork is received within said opener handle portion.

5. The combination of claim 2 wherein said knife handle portion locking means includes an arcuate groove and said spoon bowl portion locking means includes a spoon tip protrusion.

6. The combination of claim 1 wherein said means on said knife handle portion for lockingly engaging said opener utensil portion comprises a hole positioned inwardly of an edge of said knife handle, in receiving relation with an upturned lug of said opener portion.

7. The combination of claim 1 wherein said opener handle portion opposite said utensil portion has a partially open end defining means for fluid drainage.

8. The combination of claim 1 wherein said opener handle portion opposite said utensil portion includes a hanging hook secured thereto.

9. The combination of claim 3 wherein said opener is constructed in rectangular form from sheet metal having a mating seam adjacent said spoon handle portion for completely housing handle portions of said fork and spoon, and the blade portion of said knife.

10. The combination of claim 9 wherein a notch means is provided in said opener handle across said mating seam for partially receiving a spoon handle therein.

11. In combination, a container opener, a knife and a spoon, the container opener comprising a utensil portion and a handle portion, said knife having means on a handle portion thereof for lockingly engaging said opener utensil portion, said spoon having a handle portion and a bowl portion, said spoon handle portion being of substantially less width near its junction with the bowl portion than the width of the opener handle portion, notch means being provided in said opener handle portion adjacent the utensil portion for receiving said spoon handle portion of less width and preventing lateral movement of said spoon within said opener handle portion, said spoon handle portion being resiliently tensioned and in receiving engagement within said opener handle portion, said spoon bowl portion being resiliently biased against said knife handle portion.

12. The combination of claim 9 including a fork having prong portions and a handle portion; said fork being disposed between said knife and spoon with said fork prong portions being housed between said knife handle portion and said spoon bowl portion.

13. The combination of claim 9, wherein said opener handle portion opposite said utensil portion has a partially open end defining means for fluid drainage, said latter means including arcuately inturned flange portions extending toward each other, leaving a void therebetween.

References Cited

UNITED STATES PATENTS 2,516,458  7/1950  Forest _____ 30—147

FOREIGN PATENTS 615,586  1/1949  Great Britain.
1,178,122  12/1958  France.

ROBERT C. RIORDON, *Primary Examiner.*

WILLIAM FELDMAN, *Examiner.*

R. V. PARKER, JR., *Assistant Examiner.*